UNITED STATES PATENT OFFICE.

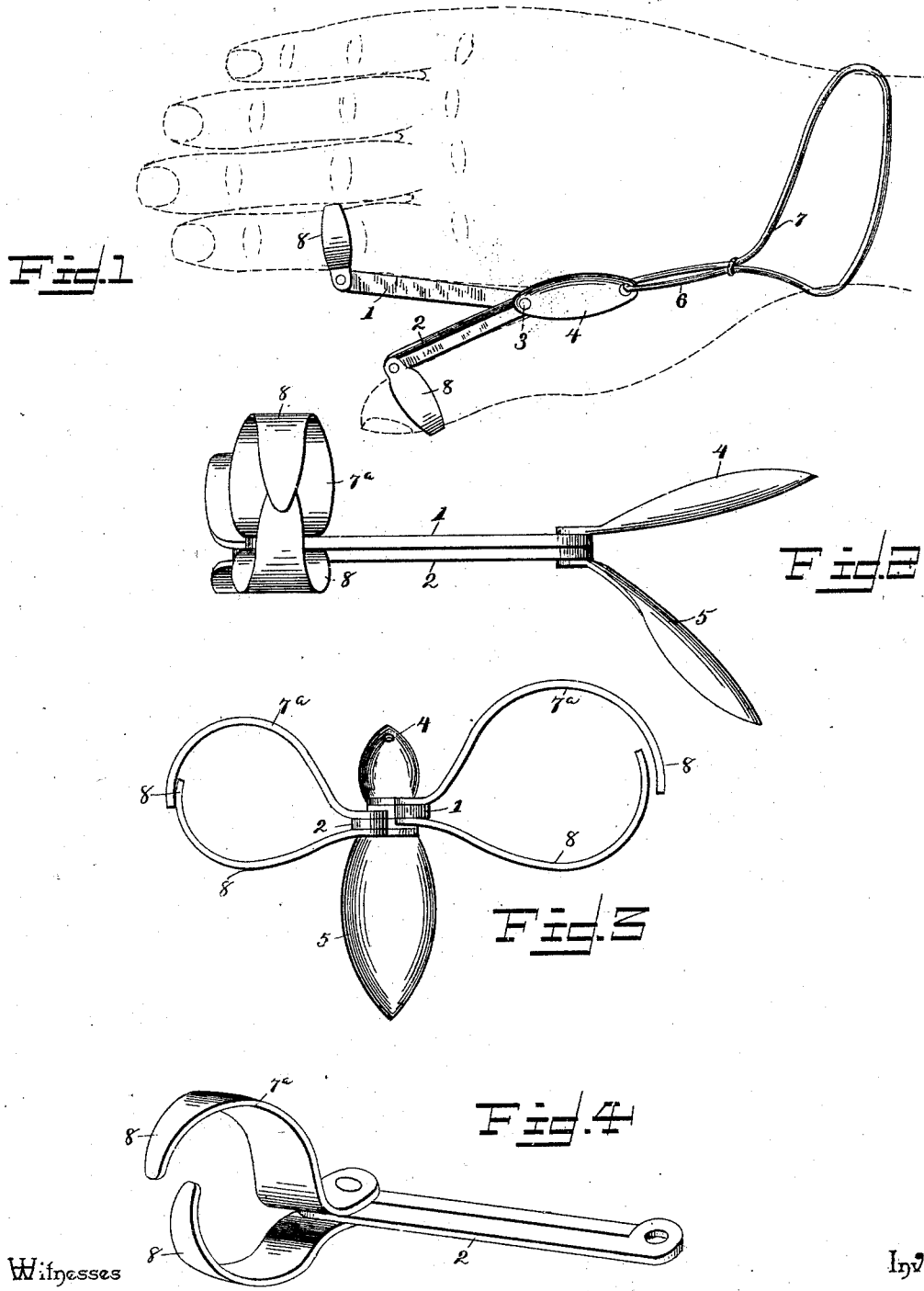

FERDINAND ELIJAH WOOD, OF POMONA, CALIFORNIA.

FRUIT-CLIPPER.

SPECIFICATION forming part of Letters Patent No. 509,990, dated December 5, 1893.

Application filed March 29, 1893. Serial No. 468,153. (No model.)

*To all whom it may concern:*

Be it known that I, FERDINAND ELIJAH WOOD, a citizen of the United States, residing at Pomona, in the county of Los Angeles and State of California, have invented a new and useful Fruit-Clipper, of which the following is a specification.

This invention relates to fruit or flower clippers, and has for its object to provide cutting shears adapted to conform themselves to the hand of the operator and freely partake of the motion of the same and at the same time be firmly held and operated to cut and hold the fruit or flowers with one hand; and are particularly designed for gathering oranges, lemons, pears, or any other stemmed fruit.

With these and other objects in view, the invention consists of the construction and arrangement of the parts thereof as will be more fully hereinafter described and claimed.

In the drawings: Figure 1 is a plan view of a fruit or flower clipper embodying the invention, and shown applied to a dotted hand. Fig. 2 is a side elevation of the improved device. Fig. 3 is a front end elevation of the same. Fig. 4 is a detail perspective view of one of the shear blades and the finger ring carried thereby, showing the latter opened.

Similar numerals of reference indicate corresponding parts in the several figures of the drawings.

Referring to the drawings, the numerals 1 and 2 designate the blades of the shears, that are pivoted at 3 at their extreme inner or rear ends, the cutting edges of said blades being adjacently situated and constructed after the manner of ordinary shears. At the rear of the blades, and movably engaged and supported by the pivot thereof, are rearwardly-extending arms 4 and 5, the arm 4 being located above the arm 5. Each of the said arms is of concavo-convex form and slightly deflected above and below the horizontal planes of the blades 1 and 2, the blades being located between the said arms. The lower arm 5 is extended downwardly at a greater angle than the upward deflection of the upper arm 4, and said lower arm bears against the palm of the hand between the thumb and forefinger and the upper arm bears on that part of the hand above the arm 5, between the thumb and forefinger and nearer the thumb, by which means the cutting blades are held firmly in position and prevented from tilting upwardly or downwardly at their rear ends, and a stable support is thereby formed for the said cutting blades.

Secured to the rear of the upper arm 4 is a double elastic cord 6, that has a loop 7 at the rear of the same that is inserted over the wrist of the operator, and by this means the clipper is held firmly in position on the hand and is prevented from slipping forwardly.

At the front end of each cutting blade is attached a sectional finger-ring $7^a$, composed in each instance of two movable arms 8, that are pivoted at their lower ends respectively to the upper and lower sides of each blade and are free to move, so that they may be readily adjusted to the fingers and have their upper ends curved in such form as to overlap when in engagement, thereby providing a greater range of adjustment.

In operating the device it is arranged as shown in Fig. 1 and the blades 1 and 2 are alternately opened and closed by spreading the thumb and forefinger apart or drawing the same together, leaving the remaining portion of the hand clear to receive the fruit or flower cut by the said blades, and thereby forming an exceptionally convenient and useful device.

It will be observed that the parts of the device are so arranged, primarily, that they may be applied to either the right or left hand without any manipulation or adjustment of the parts, and two of the devices may be employed at one time if so desired. It will also be understood that suitable metals will be employed in the makeup of the clipper, and that the elastic cord that engages the wrist of the operator may be of any suitable nature and material.

Changes in the form, proportion, and the minor details of construction may be resorted to without departing from the principle or sacrificing any of the advantages of this invention.

Having described the invention, what is claimed as new is—

1. In a fruit and flower clipper, the combination of blades pivoted together at their rear ends, sectional finger-rings pivotally connected to the front ends of said blades, a pair of arms pivotally attached to the rear ends of said blades and deflected at an angle therefrom, and a yielding cord attached to one of said arms and arranged to engage the wrist of the operator, substantially as described.

2. In a fruit and flower clipper, the combination of blades pivoted together at their rear ends, and finger-rings comprising two arms of curved form that are pivotally connected to each of the blades and normally have their free ends overlap each other, substantially as described.

3. In a fruit and flower clipper, the combination of blades pivoted together at their rear ends, and a pair of arms pivotally attached to the rear ends of said blades and superposed one above the other, said arms being deflected at an angle from said blades, and arranged to cross the hand at the joint between the thumb and fore finger, and the finger loops carried by the blades, substantially as described.

In testimony that I claim the foregoing as my own I have hereto affixed my signature in the presence of two witnesses.

FERDINAND ELIJAH WOOD.

Witnesses:
H. H. HATHAWAY,
C. S. WOOD